May 13, 1952    E. W. LOWE ET AL    2,596,419

FAUCET

Filed Dec. 29, 1945    2 SHEETS—SHEET 1

Inventors
Earl W. Lowe
Emmett M. Reedy
By
Cushman Darby Cushman
Attorneys

May 13, 1952   E. W. LOWE ET AL   2,596,419
FAUCET

Filed Dec. 29, 1945   2 SHEETS—SHEET 2

Inventors
Earl W. Lowe
Emmett M. Reedy
By Cushman Darby & Cushman
Attorneys

Patented May 13, 1952

2,596,419

UNITED STATES PATENT OFFICE 2,596,419

FAUCET

Earl W. Lowe, Decatur, Ill., and Emmett M. Reedy, Los Angeles, Calif., assignors to Mueller Co., Decatur, Ill., a corporation of Illinois Application December 29, 1945, Serial No. 637,896

6 Claims. (Cl. 251—48)

The present invention relates to faucets such as those employed in ordinary house-hold water lines. The principal object of the invention is to provide a faucet of simple and durable construction which may be conveniently installed and have its wearing parts replaced with facility.

An important object of the invention is to provide a faucet of construction wherein the valve member is positively retained on its seat without injury to the sealing surfaces of the valve or seat, and in which the effective engagement of the valve member with its seat is not impaired by thermal expansion and contraction of the valve stem.

A further object of the invention is to provide a faucet having an arrangement of packing around the valve stem, which forms an effective seal, the compression of the packing being increased at times when a tighter seal is desirable, such as when the valve is open and water is rushing through the faucet.

In the drawings, which illustrate preferred and simplified forms of the invention:

An important characteristic of the invention is a faucet construction wherein the valve member is held on its seat by means other than pressure imposed by the screw threads which move the valve member toward and from its seat. In the case of a valve member which is moved to its seat by threads on the valve member cooperating with threads on an operating stem or on the body of the faucet, there is a tendency to jam the valve by closing it too tightly, thus injuring the packing where the valve seats. This condition becomes more aggravated as the use of the valve is continued. In the case of valves in common use, and particularly when used in hot water lines, there is a tendency for the valve member to become displaced from its seat after having been closed, due to contraction of the valve stem as the metal cools after the water is shut off. The householder usually gives the handle an extra turn to retain the valve on its seat with resulting injury to the valve packing.

In the prior art, various means have been employed to improve the above described conditions. Springs have been provided between the valve member and a member connected with the body of the faucet to retain the valve member on its seat by pressure of the spring rather than by pressure exerted by the screw threads which move the valve member toward and from its seat. This result is usually accomplished by a lost motion arrangement of the valve stem with respect to the body of the faucet, as for instance, in the case of Patent 2,210,375, Mueller, August 6, 1940. Such lost motion arrangements impair the thoroughness of the seal between the valve stem and body, and annoying leakage, if the parts are not perfectly made, may result, requiring adjustments of the valve and replacement of the packing more frequently than is convenient.

In the present invention, we have accomplished the purposes referred to by providing a valve member with screw threads and grooves which engage cooperating screw threads and grooves within the body, the width of the threads being substantially less than the width of the grooves with which they cooperate, thereby permitting the usual spring to retain the valve member on its seat solely by spring pressure. In connection with the preferred form of the invention, and by reason of the above mentioned improvements, a superior packing arrangement is possible. We have provided packing which maintains a constant and effective seal but which is automatically tightened when the water is turned on, the arrangement making possible convenient replacement of the wearing parts of the packing by one unskilled in valve construction and operation.

Figure 1:
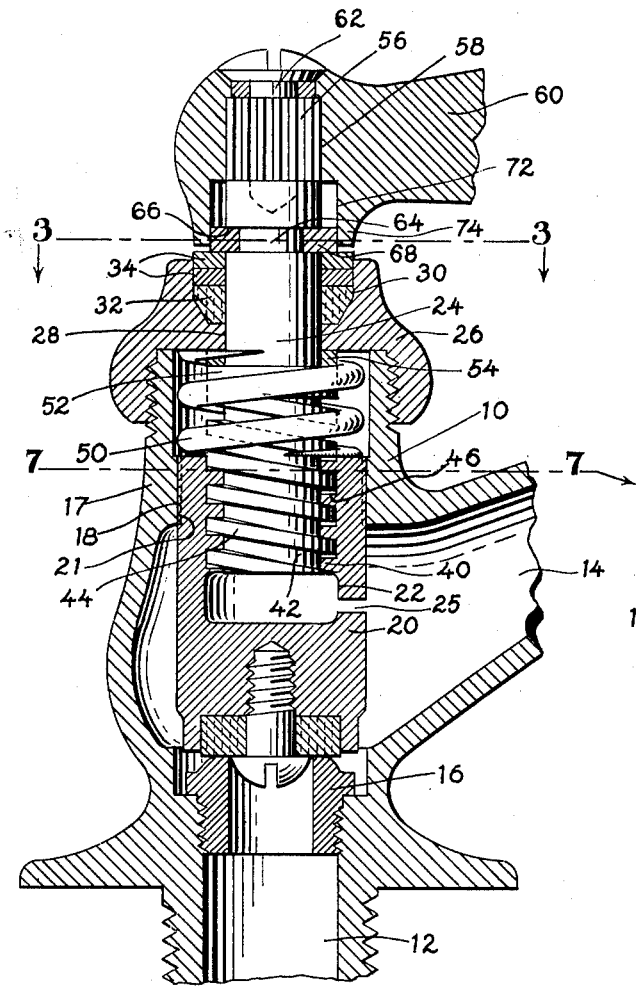
Figure 1 is a longitudinal sectional view of the faucet.

In Figure 1, the faucet is shown having a hollow body 10 with the usual inlet 12 and an outlet or spigot portion 14, there being a valve seat 16 shown as removable, defining a fluidway between the inlet and the outlet. Opposite the valve seat 16, the body has a tubular extension as at 17 forming a chamber 18 in axial alignment with the valve seat, in which chamber the valve member and other working parts to be described are positioned for operation.

The valve member or sleeve 20 is a hollow plunger preferably hexagonal in form with its corners slidably fitting within longitudinal grooves 21 in the walls of the chamber 18, so that the valve member may be translated axially from and toward its seat without being rotated around its axis.

The interior walls 22 of the valve member are provided with suitable threads and grooves between the threads. These threads and grooves cooperate with threads and grooves integral with a valve stem 24, so that when the valve stem is turned, the valve member is moved from and toward its seat in a manner well known in the art. An opening 25 may be provided from the interior of the valve member for drainage purposes.

The upper end of chamber 18 and of the faucet body is closed by a top cap or bonnet 26 which is threaded onto the extension 17 of the faucet. The bonnet 26 has a central longitudinal opening 28 therethrough, also in axial alignment with the valve seat, for the purpose of passing the valve stem 24. The outer face or end of the bonnet is suitably recessed or countersunk to a substantial depth as at 30, to receive packing around the valve stem 24, and suitable packing is provided in this recess, such as an inner ring of compressible material 32 and one or more outer washers 34 of metal or the like, the outer washer 34 extending a substantial distance beyond the outer face of the bonnet 26, so that the packing may be compressed as hereinafter described. The packing recess 30 preferably comprises a cylindrical outer portion to receive the metal washer or washers 34, and a lower portion which has its wall tapering toward the stem, so that the packing 32 can be tightly pressed toward and around the stem upon application of pressure as referred to later.

The interior threads 40 of the valve member 20 are of substantially less width, in cross section, than the corresponding grooves 42 on the exterior of the valve stem with which they cooperate, and similarly, the threads 44 on the valve stem are of substantially less width than the grooves 46 on the interior of the valve member with which they cooperate. Stated in another way, the threads on each of the cooperating parts are of the same width but are of substantially less width than the grooves on the same parts.

When the valve member 20 is being moved toward its seat, and at the time it initially touches its seat to shut off flow of fluid from the faucet, the valve member is constantly retained in its innermost position relative to its stem 24 by a spring 50, which surrounds the valve stem. This spring is of a relatively heavy construction, and is under constant compression between the outer end of the valve member 20 and the inner face of the bonnet 26. That is to say, the threads 40 on the valve member are constantly retained in the lower part of the corresponding grooves on the stem 42, with the lower face of each thread 40 in constant engagement with the upper face of one of the threads 44 of the valve stem, leaving a gap between the upper face of each thread 40 and the lower face of each thread 44.

By reason of this design of the cooperating threads and grooves, and the presence of the spring 50, the threads 40 ride around the helical upper surfaces of the threads 44 as the valve member is moved toward and from its seat, When the valve stem has been rotated in the closing direction to translate the valve member 20 inwardly to engagement with the seat 16, further rotation of the valve stem in this direction will not continue the translation of valve member, as the latter is restrained by the valve seat 16, but any slight continued rotation of the valve stem will remove the inner faces of the threads 40 from engagement with the outer faces of the threads 44, thus freeing the valve member from positive influence of the valve stem, and causing it to be retained on its seat solely by the pressure exerted by the spring 50. It will be observed that there is no rotation of the valve member as it engages its seat, thus preventing damage to the valve packing.

As previously mentioned, the construction permits use of more effective packing where the valve stem passes through the valve body, as the valve stem is mounted for rotation only, and has no translational or lost motion movement with respect to the body. The outer ends of the threads 44 on the valve stem terminate in a circular shoulder 52 having an outer face which is at right angles to the longitudinal axis to the valve stem. A suitable washer 54, of metal or the like, is provided encircling the valve stem between the shoulder 52 and the inner wall of the bonnet. This arrangement prevents outward relative movement of the valve stem with respect to the faucet body.

The valve stem terminates at its outer end in a longitudinally serrated portion 56 which engage corresponding serrations in a cavity 58 in the inner end of an operating handle 60, as is well known in the art, the handle being further retained on the valve stem by a screw 62. Below its serrated portion, but beyond the outer face of the bonnet 24 when the parts are in assembled relation, the valve stem has a reduced channel or groove 64 whose outer face forms a thrust shoulder 66. Positioned in the groove 64 is a removable collar in the form of a washer 68 preferably made of brass. This washer is of diameter sufficiently greater than that of the stem 24 to extend outwardly and rest against the outer face of the packing ring 34.

With this arrangement, and when the valve member is moved from its seat by proper rotation of handle 60, inward pressure is exerted on the valve stem 24 by the spring 50 through the valve member 20 (threads 40 of the latter bearing against the inner walls of threads 44 of the valve stem) and the inward pressure on the valve stem is imparted to the washer 68 by the thrust shoulder 66. This pressure is further transferred to the washers 34 which in turn compress the packing 32 against the stem 24 adjacent the opening 28. It will be apparent that an effective seal is thus provided at all times, due to the fact that there is no relative or lost motion movement of the valve stem 24 with respect to the faucet body. Moreover, when the valve member is moved from its seat, and the pressure of the spring 50 is exerted inwardly on the valve stem through the valve member 20, the pressure in turn exerted on the packing 32 is increased, and this pressure increases as the valve member is moved from its seat. As water rushes through the faucet in increasing volume and with increased pressure, the packing around the stem is correspondingly strengthened or tightened.

Figure 4:
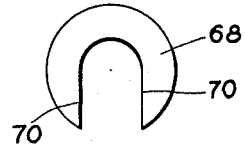
Figure 4 is a plan view of the special washer shown in Figure 1.
Figure 7:
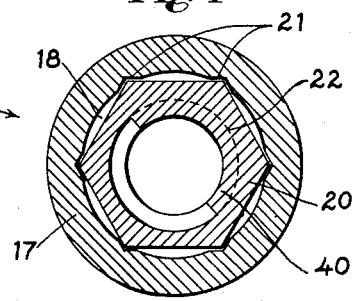
Figure 7 is a cross-sectional view taken along the line 7—7 of Figure 1, with the valve stem removed to simplify the view.

The washer 68 is preferably of design as shown in Figure 4. It is circular in its outer contour and around its interior opening for substantially a semi-circle, but the interior opening is formed into a substantially arch shape by cuts 70 which are tangential to the interior circular portion of the washer. The cross dimension between the walls 70 leading to the central opening is preferably slightly smaller than the diameter of the groove 64 of the valve stem, in order that the washer may be snapped into the groove to be there retained. This is particularly desirable when the faucet is so arranged that the valve stem extends in a horizontal rather than in the vertical direction shown in Figure 1. The face of the inner end of the handle member 60 is counterbored as at 72, forming a chamber having a skirt portion 74 which closely fits around the washer 68 to protect and conceal the same.

It will be apparent that the packing arrangement is characterized by constant effectiveness and durability. On the other hand, it may be changed by a householder with only simple instructions necessary. All that is required is to remove screw 62 and handle 60 and thereafter slip off and replace the U-shaped washer. The packing in the recess 30 can also be replaced at this time. The construction is also convenient when making initial installations, it often being the case that the faucets and valve stems are installed prior to the attachment of their handles, and the latter may be applied and the packing assembly completed with facility in a manner apparent from the above description.

Figure 2:
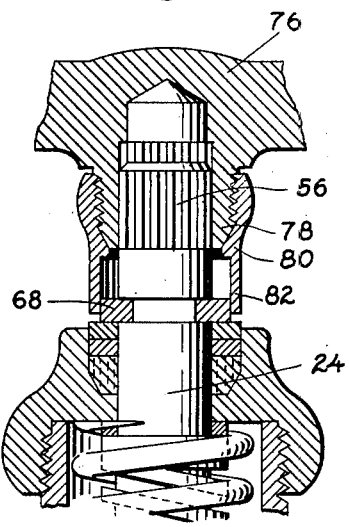
Figure 2 is a similar partial vertical sectional view of a modified form of the invention, wherein the valve stem is turned by a four arm handle.
Figure 3:
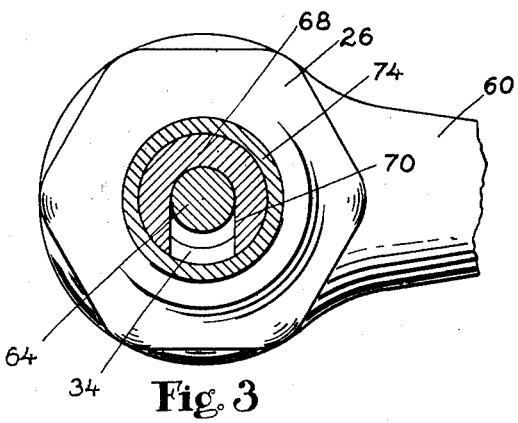
Figure 3 is a horizontal sectional view taken along the line 3—3 of Figure 1.

Figure 2 shows a slightly modified construction of the preferred form of the invention wherein a four arm handle 76 is used in place of the single arm handle 60. This handle is similarly interiorly serrated to engage the serrations 56 on the end of the valve stem, but the handle has an integral sleeve 78 exteriorly threaded to a separate sleeve 80 which in turn has a depending skirt 82 serving to protect and conceal the U-shaped washer 68 in the manner as previously described. Other than the above, the construction and operation of the arrangement of Figure 2 is identical with that described in connection with Figure 1.

Figure 5:
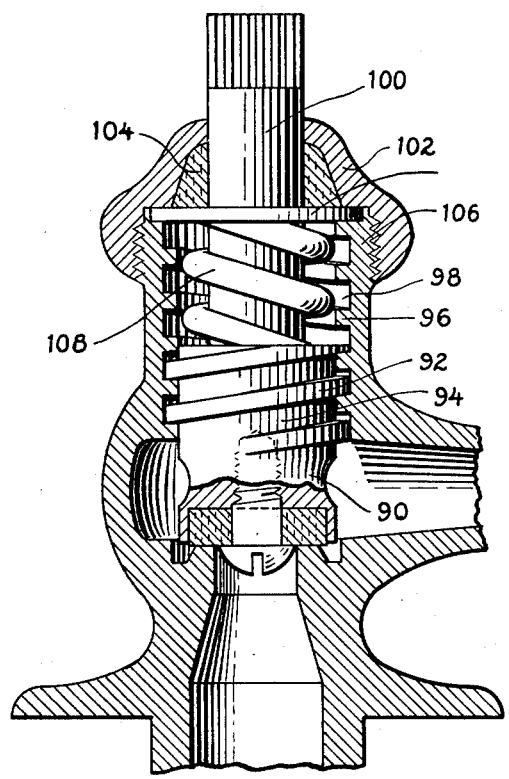
Figure 5 is a longitudinal sectional view of a faucet showing a simplified form of the invention.

Referring to Figure 5, a simplified form of the invention is disclosed wherein the valve member 90 itself carries the threads 92 and grooves 94 which cooperate with threads 96 and grooves 98 within the chamber formed by the valve body. More specifically, the threads 96 and grooves 98 are formed on the inner wall of the faucet body. In this arrangement, the valve member 90 is integrally connected with a valve stem 100 which passes through an opening in the bonnet 102 and is serrated at its outer end for purposes previously described. The interior of the body adjacent its opening is filled with a compressible packing material 104 retained by a spring washer 106 carried between the bonnet and the valve body. This packing is under the constant pressure of a spring 108 which is compressed between the washer 106 and the outer face of the valve body 90.

Figure 6:
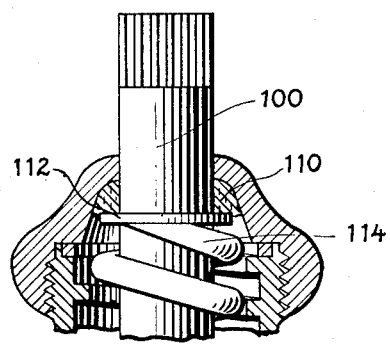
Figure 6 is a partial longitudinal sectional view of a faucet of the same simplified form, having a different packing arrangement for the valve stem.

In Figure 6, a similar arrangement is disclosed, differing only in the manner in which the packing is positioned in the inner end of the bonnet. In this embodiment, the packing 110 is retained by a friction washer 112 which extends around the valve stem 100, and the packing is compressed as previously described by a spring 114.

In these arrangements, substantially the same cooperating thread and groove arrangement is provided. That is, the threads 92 are of substantially less width than the grooves 98 in the wall of the faucet chamber in which they move, whereas the threads 96 of the chamber are of substantially less width than the grooves 94 on the valve member with which they cooperate. By reason of the spring 108 between the outer end of the valve member and the washers 106 or 112, the valve member is constantly urged toward its seat so that threads 92 are constantly in the inner part of the grooves 98, with their inner faces engaging the outer faces of the threads 96, thus leaving a gap between the outer faces of the threads 92 and the inner faces of the threads 96. When the valve has been moved inwardly to engagement with its seat as shown in Figure 5, further rotation of the valve stem in a closing direction will have the effect of displacing the threads 92 outwardly in grooves 98 so that the valve member is retained onto its seat solely by pressure of spring 108. The advantages previously described are present in this simplified embodiment of the invention.

It will be apparent that we have provided a faucet of simple construction, yet which has action superior to that of faucets of the prior art, particularly in the effectiveness of the seating of the valve member with reduction in wear on the valve packing, as well as in the continuous effectiveness of the valve stem packing and its increased effectiveness to meet the needs of increased volume of flow of fluid.

We claim:

1. A faucet comprising a body having an internal valve seat and a chamber in axial alignment with said seat, a bonnet closing the outer end of said chamber having a valve stem opening therethrough, a rigid one piece valve member mounted for axial movement in said chamber from and toward said seat and having means for restraining it against lateral movement and axial rotation therein, a spring between said bonnet and said valve member which directly engages and urges the latter toward its seat, a valve operating stem passing through the opening in said bonnet, means on said valve stem for securing same against any substantial axial movement through said opening, said valve member having threads and grooves which engage cooperating threads and grooves on said stem to move said valve member toward and from its seat upon rotation of said stem, said threads being of substantially less thickness than the cooperating grooves in which they move, whereby said valve member is capable of an independent and substantial axial movement relative to said stem and toward said seat and may be held on its seat solely by the pressure exerted by said spring.

2. A faucet comprising a hollow body having an internal valve seat, a bonnet closing one end of said body and having a valve stem opening therethrough, said bonnet having an outer packing recess around said opening with packing therein, a rotatable valve stem passing through said opening and a valve member attached to the inner end of said stem and axially movable from and toward said seat, a spring in said body between said bonnet and said valve member which urges said valve stem axially inwardly and said valve member toward its seat, a removable collar carried on said valve stem and for axial movement therewith and positioned outside of said bonnet to continuously engage the packing in said recess and compress same by the force of said spring when said valve is removed from its seat, and a handle attached to the outer end of said valve stem to rotate same.

3. A faucet comprising a hollow body having an internal valve seat, a bonnet closing one end of said body and having a valve stem opening therethrough, said bonnet having an outer packing recess around said opening with packing therein, a rotatable valve stem passing through said opening and a valve member attached to the inner end of the said stem and axially movable from and toward said seat, a spring between said bonnet and said valve member which urges said valve stem axially inwardly and said valve member toward its seat, said valve stem having a reduced portion beyond said bonnet forming a thrust shoulder, and a removable U-shaped rigid washer in said reduced portion and axially movable with said stem which engages the packing in said groove and compresses same by the force of said spring when said valve is removed from its seat, and a handle attached to the outer end of said valve stem to rotate same.

4. A faucet comprising a hollow body having an internal valve seat, a bonnet closing one end of said body and having a valve stem opening therethrough, said bonnet having a packing recess around said opening with packing therein, a rotatable valve stem passing through said opening and a valve member attached to the inner end of said stem and axially movable from and toward said seat, a spring in said body between said bonnet and said valve member which urges said valve stem inwardly and said valve member toward its seat, a removable collar carried on said valve stem and for axial movement therewith and positioned outside of said bonnet which engages the packing in said recess and compresses same by the force of said spring when said valve is removed from its seat, and a handle attached to the outer end of said valve stem to rotate same, said handle having an interior cavity defined by a skirt of diameter to pass over the outer edge of said collar to protect and conceal the same.

5. A faucet comprising a body having an internal valve seat and a chamber in axial alignment with said seat, a bonnet closing the outer end of said chamber having a valve stem opening therethrough, said bonnet having an outer packing groove around said opening with packing therein, a valve member mounted for axial movement in said chamber from and toward said seat but being restrained against axial rotation therein, a spring between said bonnet and said valve member which urges the latter toward its seat, a valve operating stem passing through the opening in said bonnet, cooperating threads and grooves on the inner end of said stem and on said valve member for moving the latter axially when said stem is turned, the threads on said stem and valve member being of substantially less thickness than the cooperating grooves in which they move so that said valve member may be held on its seat solely by pressure of said spring, means on said stem within said chamber for preventing outward movement of said stem with respect to the body, said stem having a reduced portion therein beyond said bonnet forming a thrust shoulder, a removable U-shaped washer carried in said reduced portion and of diameter to engage the packing in the groove of the bonnet around said opening without contacting that portion of the body which surrounds said groove, an operating handle secured to the outer end of said stem and having a skirt of diameter to pass over the outer edge of said washer to protect and conceal the same, said spring tending to exert an inward force on said stem through said valve member so that said thrust shoulder presses said washer against the packing with increasing force as said valve is moved from its seat.

6. A faucet comprising a body having an internal valve seat and an overlying hollow portion defining a chamber in axial alignment with said seat, a rigid one piece valve member mounted for axial movement in said chamber from and toward said seat, means for imparting axial movement to said valve member comprising a pair of concentric cylindrical walls arranged for rotation one with respect to the other in said chamber each having a single flight of engaging spiral threads and grooves, one of said walls being on said valve member and being axially movable therewith and the other of said walls being mounted in said chamber fixed against axial movement therein, said threads on each of said walls being of substantially less thickness than the grooves on the other of said walls with which they mesh, whereby said valve member is capable of an independent and substantial axial movement toward said seat relative to said other of said walls, a bonnet closing the outer end of said chamber having a valve stem opening therethrough, a rotatable valve stem extending into said chamber through said opening for actuating said axial movement imparting means, means on said valve stem for securing same against any substantial axial movement through said opening, said valve stem having a coil spring surrounding same in said chamber which engages said bonnet at its outer end and directly engages said valve member at its inner end for urging said valve member in its independent movement toward said seat.

EARL W. LOWE.
EMMETT M. REEDY.

REFERENCES CITED

The following references are of record in the file of this patent:

UNITED STATES PATENTS

| Number | Name | Date |
|---|---|---|
| 267,733 | Whittaker | Nov. 21, 1882 |
| 515,810 | Wrigley | Mar. 6, 1894 |
| 596,232 | Schmitt | Dec. 28, 1897 |
| 745,027 | Stone | Nov. 24, 1903 |
| 750,881 | Morris | Feb. 2, 1904 |
| 952,508 | Caldwell | Mar. 22, 1910 |
| 1,281,496 | Bovard | Oct. 15, 1918 |
| 1,525,516 | Smith | Feb. 10, 1925 |
| 1,841,050 | O'Stroske | Jan. 12, 1932 |
| 2,210,375 | Mueller | Aug. 6, 1940 |
| 2,273,784 | Kahl | Feb. 17, 1942 |
| 2,320,353 | Ernst | Jan. 1, 1943 |
| 2,351,211 | Hodgson | June 13, 1944 |